United States Patent

Imanishi et al.

[11] Patent Number: 6,132,331
[45] Date of Patent: Oct. 17, 2000

[54] SYNCHRONOUS CABLE USED IN CONTINUOUSLY VARIABLE TRANSMISSION OF TOROIDAL TYPE AND MANUFACTURING METHOD THEREFOR

[75] Inventors: Takashi Imanishi, Yokohama; Hiroyuki Itoh, Fujisawa, both of Japan

[73] Assignee: NSK, Ltd., Tokyo, Japan

[21] Appl. No.: 09/247,153

[22] Filed: Feb. 9, 1999

[30] Foreign Application Priority Data

Feb. 10, 1998 [JP] Japan .................................. 10-028514

[51] Int. Cl.[7] .................................................. F16H 15/38
[52] U.S. Cl. ................................................. 476/10; 476/40
[58] Field of Search .............................. 476/8, 9, 10, 40; 474/253, 255, 218; 24/35

[56] References Cited

U.S. PATENT DOCUMENTS 4,694,704  9/1987  Kraus .
4,934,206  6/1990  Nakano .
5,980,421  11/1999  Machida et al. ......................... 476/10

FOREIGN PATENT DOCUMENTS

4-52512  12/1987  Japan .

*Primary Examiner*—Charles A. Marmor
*Assistant Examiner*—Saúl Rodríguez
*Attorney, Agent, or Firm*—Christensen O'Connor Johnson Kindness PLLC

[57] ABSTRACT

A continuously variable transmission of the toroidal type comprises an input disc, an output disc, and a pair of rockable trunnions. A synchronous cable is passed around and between the trunnions, crossing in the shape of the figure "8". The synchronous cable includes a wire rope and a pair of retainers fixed thereto. Each retainer is formed of an arcuate metallic tube attached to its corresponding trunnion. The intermediate portion of the tube other than the opposite end portions thereof in the lengthwise direction is fixed to the wire rope by caulking. The opposite ends of the wire rope are connected by means of one of the retainers under a torsional stress such that the synchronous cable can maintain the 8-shaped form in a free state without the influence of any external force.

8 Claims, 8 Drawing Sheets

SYNCHRONOUS CABLE USED IN CONTINUOUSLY VARIABLE TRANSMISSION OF TOROIDAL TYPE AND MANUFACTURING METHOD THEREFOR

BACKGROUND OF THE INVENTION

The present invention relates to continuously variable transmissions of the toroidal type for use as, for example, automotive transmissions or transmissions for various industrial machines, and more particularly, to an improvement of a synchronous cable for synchronously rotating at least a pair of power rollers stored in a continuously variable transmission of the toroidal type.

Figure 15A:
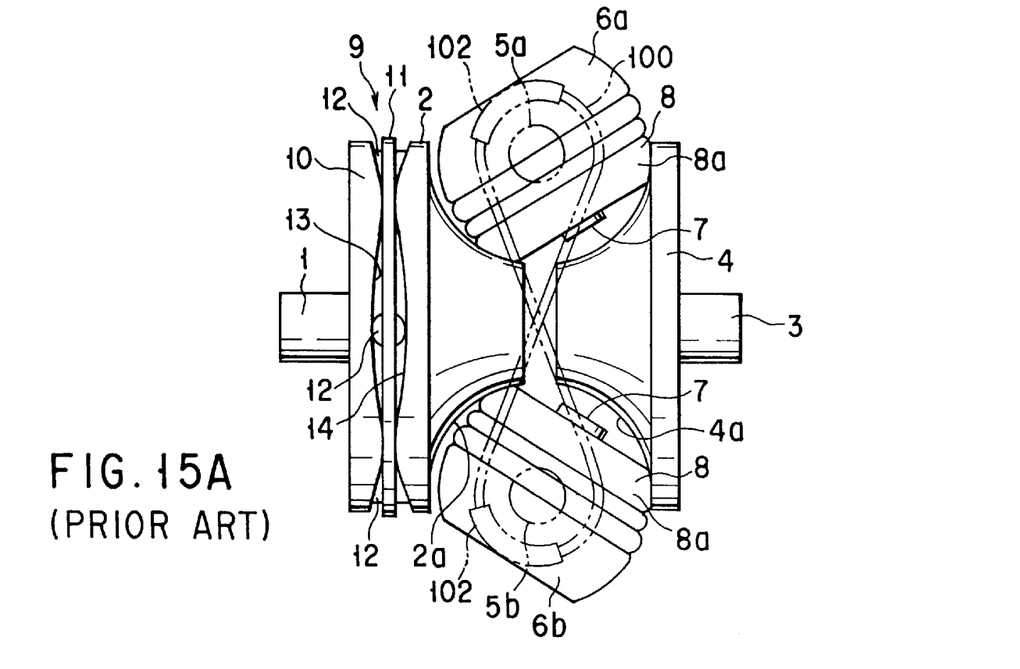
FIGS. 15A and 15B are side views individually schematically showing different modes of operation of a conventional continuously variable transmission of the toroidal type.
Figure 15B:
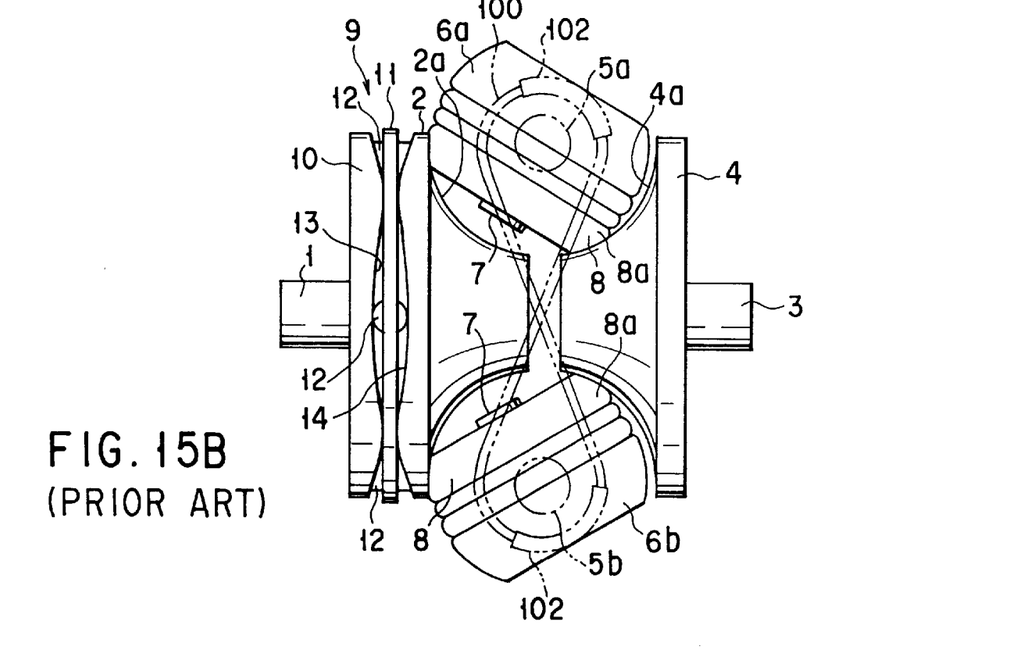

FIGS. 15A and 15B show a continuously variable transmission of the toroidal type as a known example of an automotive transmission. This transmission comprises an input disc 2 mounted on an input shaft 1, an output shaft 3 coaxial with the input shaft 1, and an output disc 4 fixed to an end portion of the output shaft 3. Trunnions 6a and 6b, which can rock around their corresponding pivots 5, are arranged inside a casing (not shown) that contains the continuously variable transmission.

A displacement shaft 7 is provided in the central portion of each of the trunnions 6a and 6b. When the trunnions 6a and 6b are rocked individually around the pivots 5, the tilt angle of each shaft 7 changes. A power roller 8 is rotatably supported on each shaft 7. The power roller 8 is located between the input and output discs 2 and 4. Opposite inner surfaces 2a and 4a of the discs 2 and 4 are concave surfaces that are obtained as circular arcs around the pivots 5 are rotated individually around the shafts 1 and 3. A peripheral surface 8a of each power roller 8 is a spherical surface, which is contact with the respective inner surfaces 2a and 4a of the discs 2 and 4.

A push device 9 of the loading-cam type is provided between the input shaft 1 and the input disc 2. The device 9 elastically presses the input disc 2 toward the output disc 4. The device 9 includes a cam plate 10 rotatable together with the input shaft 1 and a plurality of (e.g., four) rollers 12 that are held by means of a holder 11. A cam surface 13 is formed on one surface (on the right-hand side of FIG. 15A) of the cam plate 10. The cam surface 13 has undulation in the circumferential direction of the plate 10. An undulating cam surface 14 is also formed on the other surface (on the left-hand side of FIG. 15A) of the input disc 2. The rollers 12 are rotatably supported by means of shafts that extend radially from the input shaft 1.

When an engine is actuated, the cam plate 10 in the continuously variable transmission of the toroidal type with the above-described construction rotates together with the input shaft 1. Thereupon, the rollers 12 are pressed against the cam surface 14 of the input disc 2 by means of the cam surface 13. In consequence, the input disc 2 is pressed against the power rollers 8, and the cam surfaces 13 and 14 are connected to the rollers 12, whereupon the input disc 2 rotates. The turning effort of the input disc 2 is transmitted to the output disc 4 through the power rollers 8, whereupon the output disc 4 and the output shaft 3 rotate.

The rotations of the input and output shafts 1 and 3 can be slowed down by tilting the displacement shafts 7 so that the respective peripheral surfaces 8a of the power rollers 8 are individually in contact with portions which are near the central of the inner surface 2a of the input disc 2 and portions which are near the outer peripheral of the inner surface 4a of the output disc 4, as shown in FIG. 15A. On the other hand, the rotations of the input and output shafts 1 and 3 can be speeded up by rocking the trunnions 6a and 6b in the opposite direction, as shown in FIG. 15B. Further, a transmission ratio intermediate between those for the speed reduction and increase modes can be obtained by adjusting each displacement shaft 7 to a tilt angle intermediate between the ones shown in FIGS. 15A and 15B.

Figure 16:
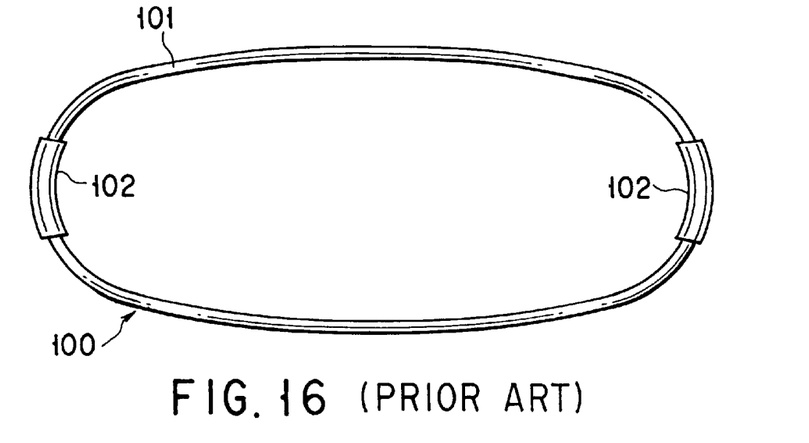
FIG. 16 is a side view of a conventional synchronous cable.
Figure 17:
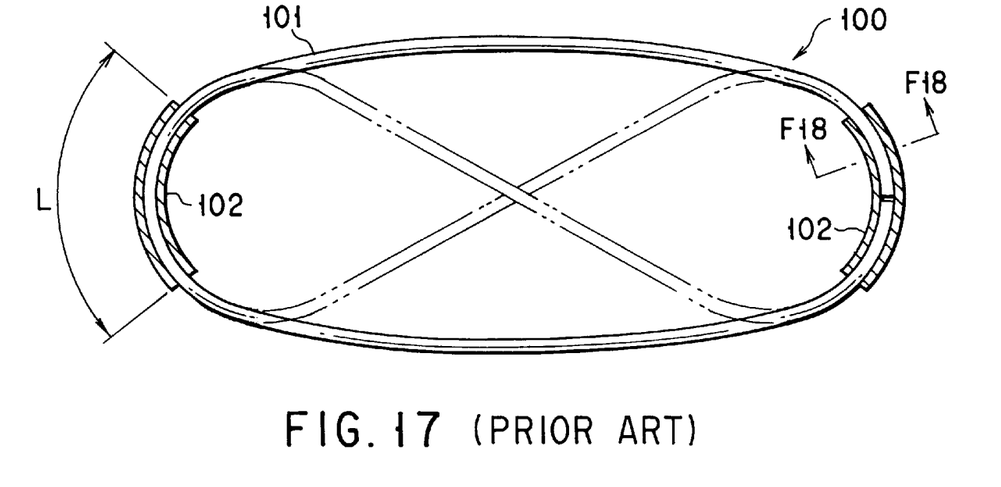
FIG. 17 is a partially-sectional side view of another conventional synchronous cable.

A synchronous cable 100 is passed around the respective peripheral surfaces of end portions of the trunnions 6a and 6b. As shown in FIG. 16, the cable 100 includes a wire rope 101 in the form of an endless loop and a pair of metallic retainers 102 that are fixed to the rope 101 in opposite positions. In incorporating the cable 100 into the continuously variable transmission of the toroidal type, the wire rope 101 is twisted to cross in the shape of the figure "8", as indicated by two-dot chain lines in FIG. 17. Then, the retainers 102 are fitted individually into retainer mounting portions of the trunnions 6a and 6b. By doing this, the synchronous cable 100 and the trunnions 6a and 6b can be caused to engage one another without slippage.

The synchronous cable 100 serves to synchronize the respective tilting or rocking motions of the trunnions 6a and 6b around their corresponding pivots 5. More specifically, the cable 100 functions as safety means for synchronously tilting the trunnions 6a and 6b in case of failure of an actuator (hydraulic drive unit) for tilting the trunnions. With use of the synchronous cable 100, excessive frictional force can be prevented from acting between the inner surfaces 2a and 4a of the discs 2 and 4 and the respective peripheral surfaces 8a of the power rollers 8, so that the continuously variable transmission can avoid being fatally damaged. Even in case of such failure, moreover, the transmission can secure its minimum power transmitting function.

As the conventional synchronous cable 100 is incorporated into the continuously variable transmission of the toroidal type, its shape is changed into the shape of the figure "8" in a manner such that the simple loop shown in FIG. 16 is twisted by means of external force. Accordingly, the conventional cable 100 is restored to the simple loop, as shown in FIG. 16, if the external force is removed. In incorporating the cable 100 into the continuously variable transmission, therefore, the wire rope 101 must be subjected to the external force to maintain its 8-shaped form, as indicated by two-dot chain lines in FIG. 17, as the retainers 102 are fitted individually into the retainer mounting portions of the trunnions 6a and 6b. This operation is troublesome and constitutes a hindrance to efficient assembling of the continuously variable transmission of the toroidal type.

Further, the conventional synchronous cable 100 has the following drawbacks to be improved. In the cable 100, the retainers 102, formed of metallic tubes, are fitted on the opposite end portions and middle portion of the wire rope 101, and are fastened to the rope 101 by being caulked throughout their overall length L. If the actuator for driving the trunnions 6a and 6b gets out of order, a force of hundreds of kgf may act on the synchronous cable 100, in some cases. Therefore, the rope 101 and the retainers 102 must be firmly fixed to one another. However, the conventional synchronous cable involves the following problems.

(1) Since the metallic tube as the material of each retainer 102 must be fixed to the wire rope 101 by being caulked throughout the overall length L, it is formed of gun metal (copper alloy such as Cu—Sn or Cu—Sn—Zn) that is lower in hardness than iron. Owing to the softness of gun metal, however, the strength of the retainers 102 cannot be enhanced. If a substantial tensile load acts on the rope 101, therefore, the retainers 102 may possibly be disengaged from the rope 101.

(2) Since the end faces of the retainers 102 are brought heavily into contact with the retainer mounting portions of their corresponding trunnions 6a and 6b, they are easily worn or deformed, sometimes producing substantial backlash between them. The synchronous cable 100 must serve to equalize the respective tilts of the power rollers 8 in case of failure of the actuator. If the backlash between the trunnions 6a and 6b and the retainers 102 is too much, however, it is hard to equalize the tilts of the rollers 8.

Figure 18:
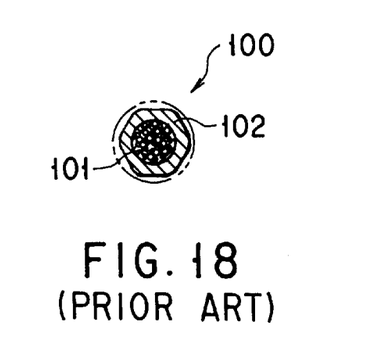
FIG. 18 is a sectional view taken along line F18—F18 of FIG. 17.

(3) If each retainer 102 is caulked throughout the overall length L, the resulting outline of each end portion thereof becomes smaller than the previous one (indicated by two-dot chain line in FIG. 18). In consequence, the cross-sectional areas of contact portions between the retainer mounting portions of the trunnions 6a and 6b and the retainers 102 are reduced, so that the contact pressure increases. Thus, the retainers 102 can be worn or deformed more easily.

BRIEF SUMMARY OF THE INVENTION

Accordingly, a first object of the present invention is to provide a synchronous cable, in which retainers can be prevented from being disengaged from a wire rope when the cable is subjected to a substantial tensile load, and there is no substantial backlash between the retainers and retainer mounting portions of trunnions, so that wear or deformation of the retainers can be restrained.

A second object of the invention is to provide a synchronous cable, capable of being handled with ease as it is incorporated into a continuously variable transmission of the toroidal type, thus ensuring highly efficient incorporating operation.

In order to achieve the first object, according to the present invention, the synchronous cable comprises a wire rope passed around and between a pair of trunnions, crossing in the shape of the figure "8", and one retainer connecting the opposite ends of the wire rope to make the rope an endless loop and the other retainer situated opposite to the one retainer, the retainers being attached individually to the trunnions, each of the retainers being formed of an arcuate metallic tube extending along the circumference of each corresponding trunnion, the intermediate portion of the tube other than the longitudinally opposite end portions thereof being fixed to the wire rope by caulking.

The synchronous cable with this construction can use the retainers that are formed of a stiff material such as a ferrous metal. Accordingly, the fixing strength for the ranges in which the retainers are fixed to the wire rope by caulking can be improved, and the wire rope can be prevented from slipping out of each tube. Since the opposite end portions of each tube are not caulked, moreover, satisfactory contact areas can be secured between the tube and the retainer mounting portions of the trunnions.

According to the invention, each of the retainers has the shape of a circular arc extending along the circumference of each corresponding trunnion and is formed into a tube by casting and fixed to the wire rope, the tube surrounding a portion of the wire rope to be fitted with the retainer. In the synchronous cable constructed in this manner, the retainers are fixed integrally to the wire rope by casting, so that the fixing strength between the retainers and the wire rope can be improved considerably.

According to the invention, moreover, each of the retainers includes an arcuate first retainer element fixed to the wire rope and second retainer elements arranged individually near the opposite ends of the first retainer element so as to be rotatable relatively thereto. In the synchronous cable constructed in this manner, the second retainer elements can rotate relatively to the first retainer element, so that the points of contact between the retainer mounting portions of the trunnions and the second retainer elements are not fixed. As compared with the case where these members touch one another in fixed positions, therefore, wear or deformation of the retainers can be made smaller.

In order to achieve the second object, the synchronous cable according to the invention is designed so that the opposite ends of the wire rope are connected by means of a retainer under a torsional stress such that the synchronous cable can maintain an 8-shaped form in a free state without the influence of any external force. The shape of the synchronous cable with this construction in the free state before incorporation into a continuously variable transmission of the toroidal type is similar to the shape obtained after the incorporation. In incorporating this synchronous cable into the transmission, therefore, the shape of the cable need not be compulsorily changed into the shape of the figure "8" by means of external force. In consequence, the retainers that constitute the synchronous cable can be easily fitted into the retainer mounting portions of the trunnions, so that the efficiency of operation for assembling the continuously variable transmission can be improved.

A manufacturing method for a synchronous cable according to the invention comprises a process for fixing one retainer to the central portion of a wire rope with respect to the lengthwise direction thereof, a process for twisting the wire rope to make the rope cross in the shape of the figure "8", and a process for connecting the opposite ends of the wire rope by means of the other retainer while keeping the wire rope twisted so that the synchronous cable can maintain the 8-shaped form in a free state without the influence of any external force.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A first embodiment of the present invention will now be described with reference to the accompanying drawings of FIGS. 1 to 5. In these drawings and FIGS. 15A and 15B used in the description of the prior art example, common reference numerals refer to common parts.

Figure 1:
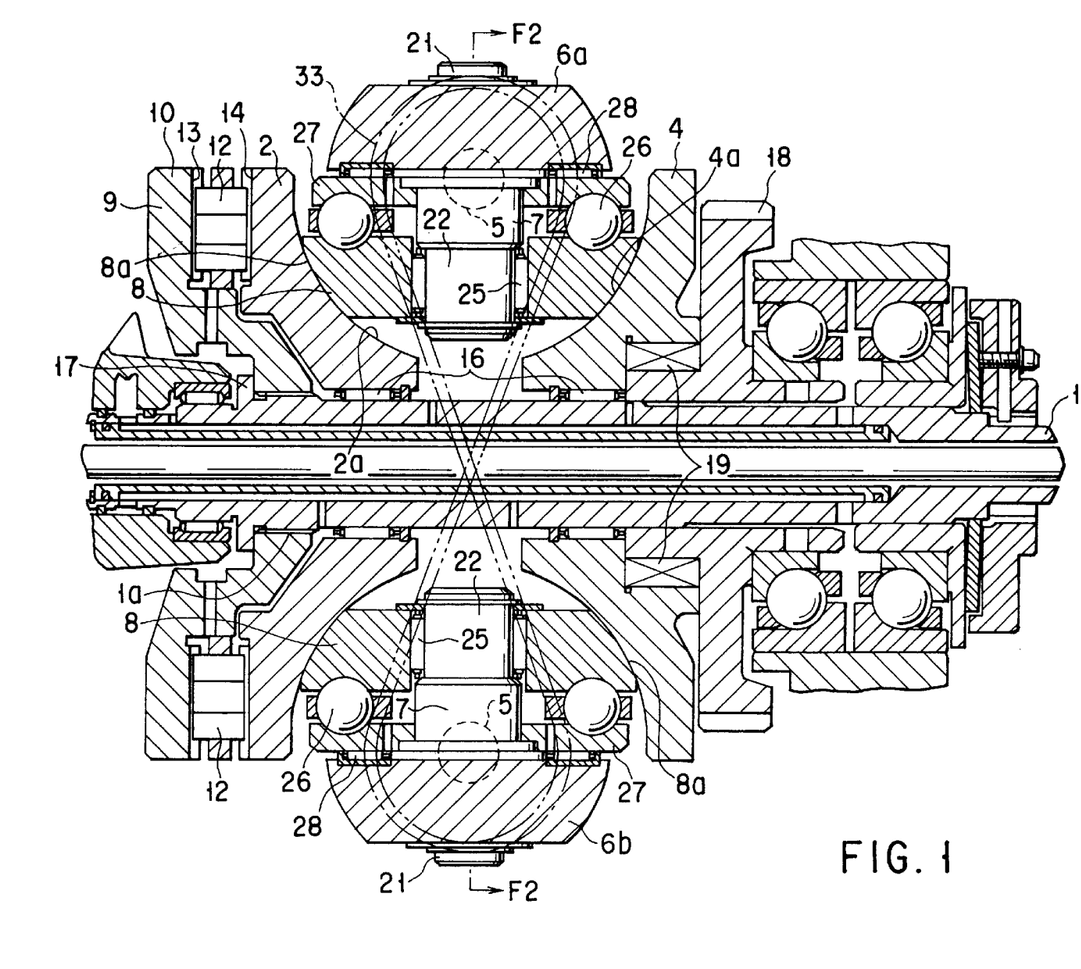
FIG. 1 is a sectional view of a continuously variable transmission of the toroidal type.
Figure 2:
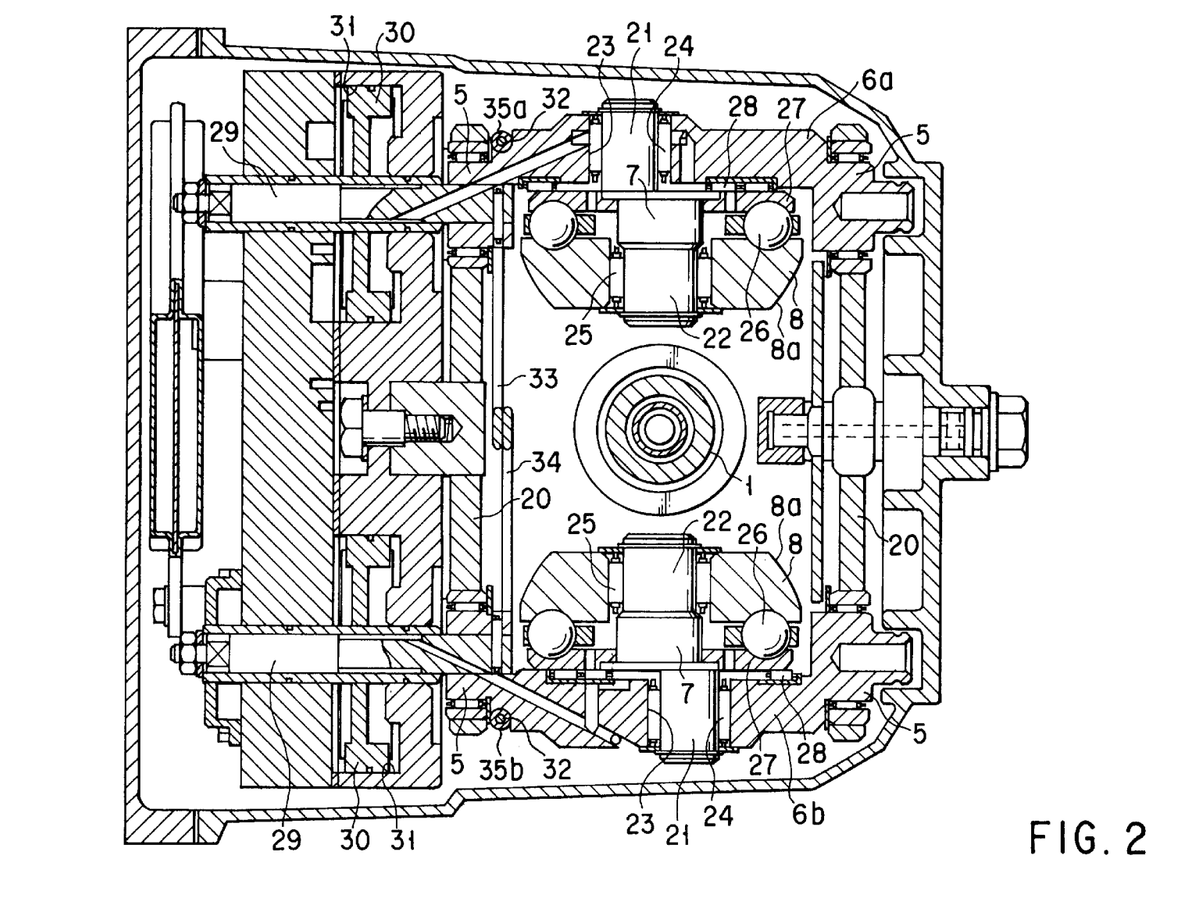
FIG. 2 is a sectional view taken along line F2—F2 of FIG. 1.

A continuously variable transmission of the toroidal type shown in FIGS. 1 and 2 has an input shaft 1 in the form of a round tube, which rotates integrally with a drive source including an engine and the like. The input shaft 1 is fitted with an input disc 2 and an output disc 4 that are spaced in the axial direction of the shaft 1. A cam plate 10 is in spline-engagement with an end portion 1a of the input shaft 1. A collar portion 17 prevents the cam plate 10 from moving away from the input disc 2. The cam plate 10 and rollers 12 constitute a push device 9 of the loading-cam type. The push device 9 serves to rotate the input disc 2 while pressing it toward the output disc 4 as the input shaft 1 rotates. An output gear 18 is coupled to the output disc 4 by means of a key 19. The output disc 4 and the output gear 18 rotate integrally with each other. The input and output discs 2 and 4 are rotatably supported on the input shaft 1 by means of their corresponding needle bearings 16.

A pair of trunnions 6a and 6b are supported individually on a pair of support plates 20 for rocking motion and displacement in the axial direction (horizontal direction of FIG. 2). A displacement shaft 7 of each of the trunnions 6a and 6b is inserted in a circular hole 23 in the middle portion of each trunnion. The shaft 7 includes a support shaft portion 21 and a pivot portion 22, which extend parallel and eccentrically to each other. The support shaft portion 21 is inserted in the circular hole 23 and rotatably supported by means of a radial needle bearing 24. The pivot portion 22 supports a power roller 8 for rotation by means of a radial needle bearing 25.

A thrust ball bearing 26 and a thrust needle bearing 28 are arranged between the power roller 8 and each trunnion 6a or 6b. The needle bearing 28 supports thrust load that acts on an outer race 27 of the ball bearing 26. The thrust ball bearing 26 bears thrust load that acts on the power roller 8 without prohibiting the roller 8 from rotating. The thrust needle bearing 28 supports thrust load from the roller 8 that acts on the outer race 27, and allows the pivot portion 22 and the race 27 to turn around the support shaft portion 21. As shown in FIG. 2, a drive rod 29 is coupled to one end portion of each trunnion 6a or 6b. A drive piston 30 is fixed to the middle portion of the rod 29. The piston 30 is stored in a drive cylinder 31. The piston 30 and the cylinder 31 constitute a hydraulic actuator for displacing each trunnion in the axial direction of a pivot 5.

When the continuously variable transmission of the toroidal type with the above-described construction operates, the rotation of the input shaft 1 is transmitted to the input disc 2 by means of the push device 9. The rotation of the input disc 2 is transmitted to the output disc 4 through the paired power rollers 8. Further, the rotation of the output disc 4 is fetched by the output gear 18. In changing the rotational speed ratio between the input shaft 1 and the output gear 18, the paired drive pistons 30 are displaced for equal distances in opposite directions. As the pistons 30 are displaced in this manner, the trunnions 6a and 6b are displaced in opposite directions. Thereupon, the directions of tangential forces at points of contact between a peripheral surface 8a of each power roller 8 and inner surfaces 2a and 4a of the discs 2 and 4 change. As these forces are redirected in this manner, the trunnions 6a and 6b rock in opposite directions around their corresponding pivots 5. In consequence, the points of contact between the peripheral surface 8a of each power roller 8 and the inner surfaces 2a and 4a of the discs shift their positions, so that the rotational speed ratio between the input shaft 1 and the output gear 18 changes.

Figure 3A:
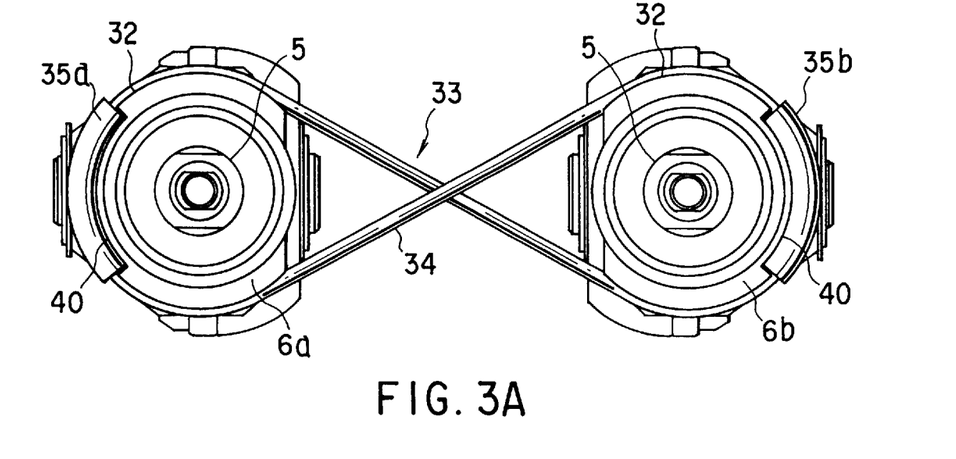
FIGS. 3A, 3B and 3C are side views individually showing modes of operation of trunnions and synchronous cable of the continuously variable transmission shown in FIG. 1.
Figure 3B:
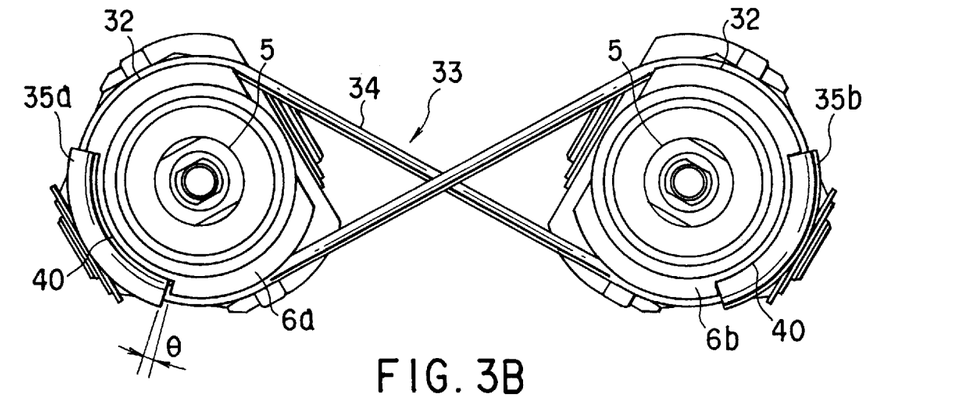
Figure 3C:
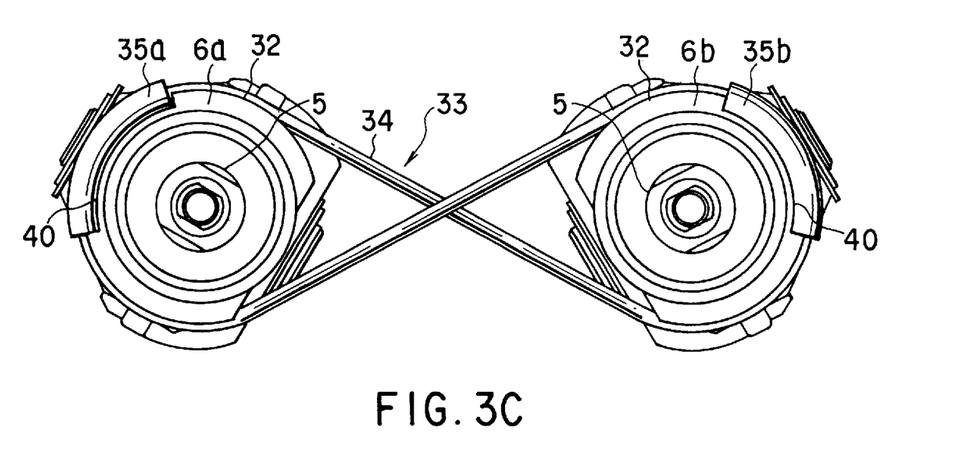
Figure 4:
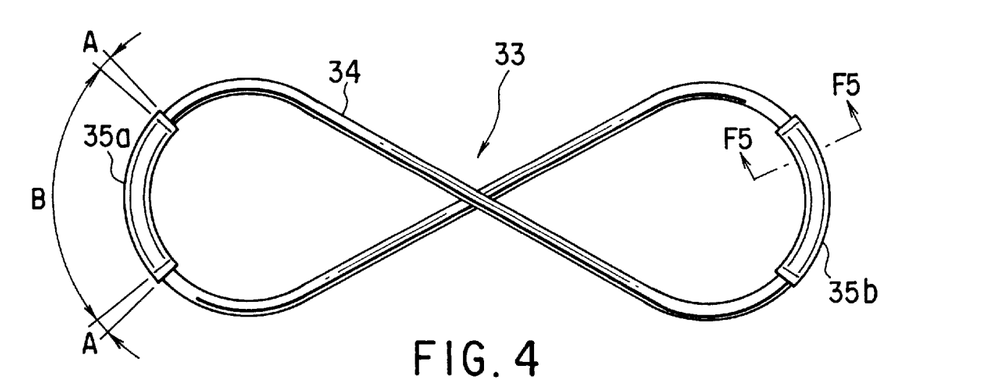
FIG. 4 is a side view of a synchronous cable according to a first embodiment of the present invention.

As shown in FIGS. 3A, 3B and 3C, an arcuate groove 32 is formed on the outer peripheral surface of an end portion of each of the trunnions 6a and 6b so as to extend concentrically with each corresponding pivot 5 in the circumferential direction of each trunnion. A synchronous cable 33 is passed around the respective arcuate grooves 32 of the trunnions 6a and 6b, crossing in the shape of the figure "8". As shown in FIG. 4, the cable 33 includes a wire rope 34 in the form of an 8-shaped endless loop and a pair of retainers 35a and 35b that are fixed to the rope 34 in opposite positions.

The synchronous cable 33 serves to synchronize the respective tilting motions (or rotary motions) of the trunnions 6a and 6b around their corresponding pivots 5. FIGS. 3A, 3B and 3C show angular relations between the trunnions 6a and 6b in various shift positions. FIG. 3A shows a state in which the speed ratio (ratio of the rotational speed of output disc 4 to that of the input disc 2) is 1.0. FIGS. 3B and 3C show states in which the speed ratio is LOW and HIGH, respectively. The cable 33 serves to tilt the trunnions 6a and 6b synchronously in case of failure of the actuator that is composed of the drive rod 29, piston 30, cylinder 31, etc.

The retainers 35a and 35b are arcuate metallic tubes that extend along the respective circumferences of their corresponding trunnions 6a and 6b. They are secured to the trunnions 6a and 6b without slippage by being fitted individually in retainer mounting portions 40 that are continuous with their corresponding arcuate grooves 32 on the trunnions.

In the case of a vehicle that enjoys a generous engine displacement, a heavy tensile load acts on the synchronous cable 33. Preferably, therefore, the outside diameter of the wire rope 34 should be adjusted to φ3 to φ5 mm, and those of the metallic tubes for the retainers 35a and 35b to φ7 to φ10 mm. In the case of a small-displacement vehicle, the tensile load that acts on the cable 33 is so small that the outside diameter of the rope 34 is expected to be adjusted to only φ2 to φ3 mm, and those of the metallic tubes for the retainers 35a and 35b to only φ5 to φ6 mm. For example, the wire rope 34 is a right-hand ordinary lay rope that has a stranded wire configuration, 7×19, such that strands in the rope and wires in each strand are seven and nineteen, respectively, in number.

Figure 5:
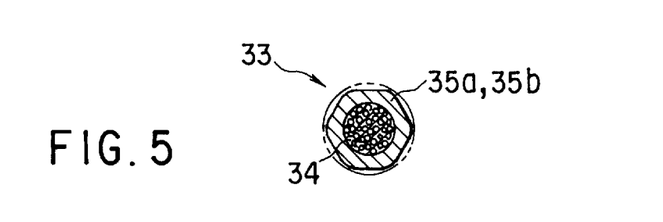
FIG. 5 is a sectional view taken along line F5—F5 of FIG. 4.

The metallic tubes for the retainers 35a and 35b are formed of a ferrous metal, such as SS400 (JISG3101 which corresponds to ASTM A36-96 or A283-93). These tubes are arcuate structures that extend along the arcuate grooves 32 of the trunnions 6a and 6b, respectively. The other portion (intermediate portion in the lengthwise direction) of each of the metallic tubes than the longitudinally opposite end portions thereof is fixed to the wire rope 34 by caulking. Thus, the opposite end portions (uncaulked ranges A) of the retainers 35a and 35b have an entire circular cross section without deformation. At these opposite end portions, there are narrow gaps between the outer peripheral surface of the rope 34 and the respective inner peripheral surfaces of the retainers 35a and 35b. As shown in FIG. 5, the cross section of each of ranges B where the retainers 35a and 35b are caulked is in the shape of a slightly shrunk hexagon, the inner peripheral surface of which is firmly fixed to the outer peripheral surface of the rope 34 by contact bonding.

The retainers 35a and 35b are fitted in the retainer mounting portions (recesses) 40 of the trunnions 6a and 6b, respectively. Preferably, the gaps between the respective end faces of the retainers 35a and 35b and the inner end faces of the mounting portions 40 should be within an angular range (θ) from 0.5 to 2.0°. If the angle θ is wider than 2.0°, the difference between the respective rocking angles of the trunnions 6a and 6b exceeds its tolerance. If the angle θ is narrower than 0.5°, it is difficult to fit the retainers 35a and 35b into their corresponding mounting portions 40.

As mentioned before, the retainers 35a and 35b can be fixed more strongly to the wire rope 34 by caulking in a manner such that the intermediate portions of the retainers 35a and 35b which are formed of a high-stiffness ferrous metal are caulked than the case of caulking conventional soft gun metal (copper alloy). Accordingly, the caulking strength in the caulked range B is improved considerably, so that the rope 34 can be prevented from slipping off the retainers 35a and 35b. Since the opposite end portions of the retainers 35a and 35b are not caulked, moreover, the area of contact between the retainer mounting portions 40 of the trunnions 6a and 6b and the retainers 35a and 35b is not reduced. Therefore, the contact pressure between the trunnions 6a and 6b and the retainers 35a and 35b can be lowered. Since the retainers 35a and 35b are formed of a stiff ferrous metal, not the conventional soft gun metal (copper alloy), furthermore, the end portions of the retainers 35a and 35b, which are in contact with the ferrous trunnions 6a and 6b, can be restrained from being worn or deformed, so that the durability of the retainers can be improved.

Figure 6:
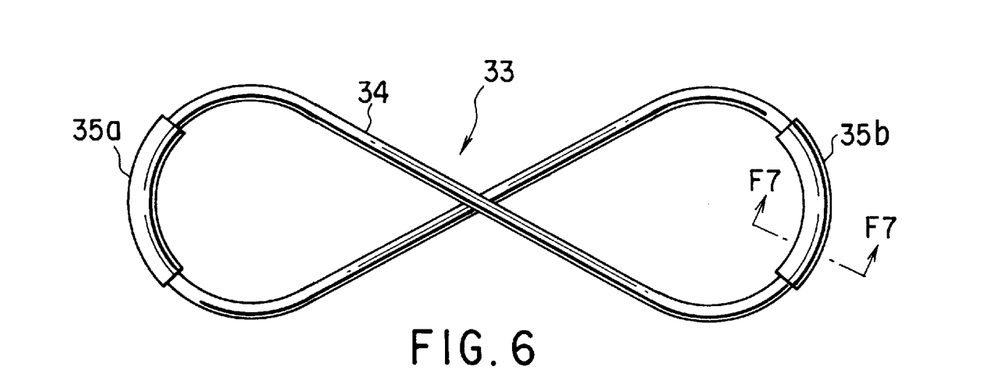
FIG. 6 is a side view of a synchronous cable according to a second embodiment of the invention.

FIG. 6 shows a second embodiment of the present invention. Like components are designated by like symbols in the first and second embodiments, and a description of those components is omitted. A synchronous cable 33 according to the second embodiment is composed of a wire rope 34 and a pair of retainers 35a and 35b that are fixed to the rope 34 and fitted individually in retainer mounting portions 40 of the trunnions 6a and 6b. The retainers 35a and 35b extend arcuately along the respective circumferences of their corresponding trunnions 6a and 6b.

Figure 7:
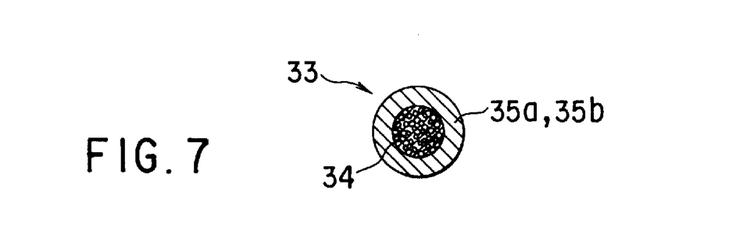
FIG. 7 is a sectional view taken along line F7—F7 of FIG. 6.

Shapes of the retainers 35a and 35b of this embodiment are tube-like that are formed by casting so as to surround specific portions (to be fitted with the retainers 35a and 35b) of the wire rope 34, individually. Specific portions of a large number of wires that constitute the wire rope 34 are put into a mold, and a molten metallic material for the retainers 35a and 35b is injected into the mold. The retainers 35a and 35b and the rope 34 are bonded to each other by curing the metallic material. If the retainers 35a and 35b are fixed to the rope 34 by this casting method, the bonding strength between these members is further improved. Since each retainer is formed by casting, moreover, the outer peripheral surface of each retainer can be shaped like a cylinder, as shown in FIG. 7. Thus, the fitness of the retainer mounting portions 40 and the retainers 35a and 35b is further improved.

Figure 8:
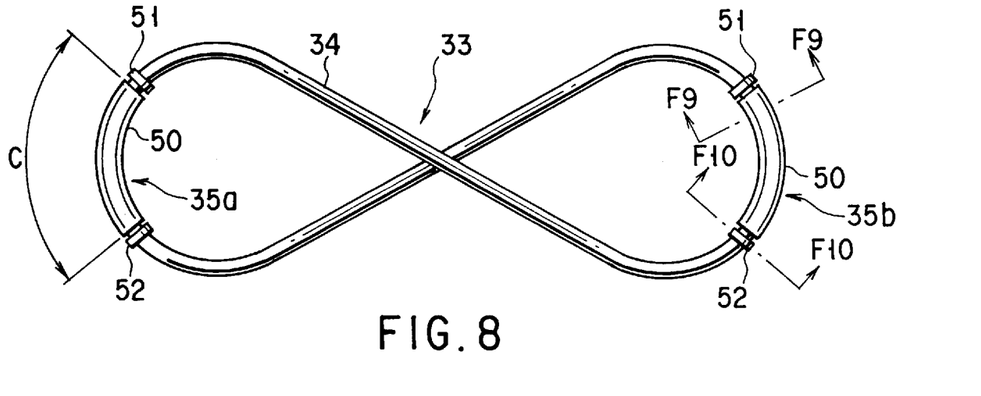
FIG. 8 is a side view of a synchronous cable according to a third embodiment of the invention.

FIG. 8 shows a third embodiment of the present invention. Like components are designated by like symbols in the first and third embodiments, and a description of those components is omitted. A synchronous cable 33 according to the third embodiment is also composed of a wire rope 34 and a pair of retainers 35a and 35b fixed thereto. The retainers 35a and 35b are fitted individually in retainer mounting portions 40 of the trunnions 6a and 6b. Each of the retainers 35a and 35b includes three components, a first retainer element 50 fixed to the wire rope 34 and second retainer elements 51 and 52 that are arranged individually near the opposite ends of the first retainer element 50 so as to be rotatable relatively thereto. The first retainer element 50 extends arcuately along the circumference of each corresponding trunnion 6a or 6b.

Figure 9:
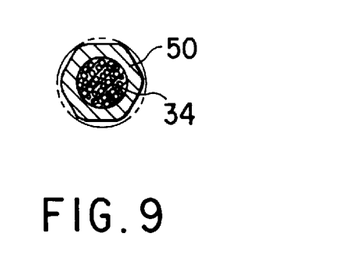
FIG. 9 is a sectional view taken along line F9—F9 of FIG. 8.
Figure 10:
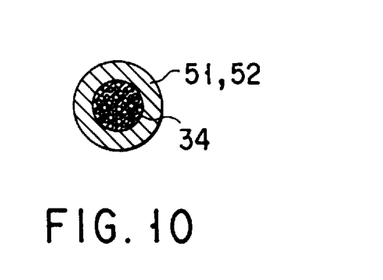
FIG. 10 is a sectional view taken along line F10—F10 of FIG. 8.

The first retainer element 50 may be fixed to the wire rope 34 by putting a cylindrical metallic tube on the rope 34 and then caulking it for a range C, as in the case of the first embodiment. Alternatively, the element 50 may be molded in the shape of a cylinder by the casting method, as described in connection with the second embodiment, and fixed to the wire rope 34. The second retainer elements 51 and 52 are metallic rings put on the rope 34. The second elements 51 and 52 can move in the lengthwise direction of the rope 34 and rotate in the circumferential direction with respect to the first element 50.

Thus, according to this embodiment, the retainers 35a and 35b have a three-division structure, and the second retainer elements 51 and 52 are designed so as to be rotatable with respect to the wire rope 34. With this arrangement, the points of contact between the retainers 35a and 35b and the retainer mounting portions 40 are not fixed. As compared with the case where these members always touch one another in fixed positions, therefore, wear or deformation of the retainers 35a and 35b can be restricted to a lower level.

Figure 11:
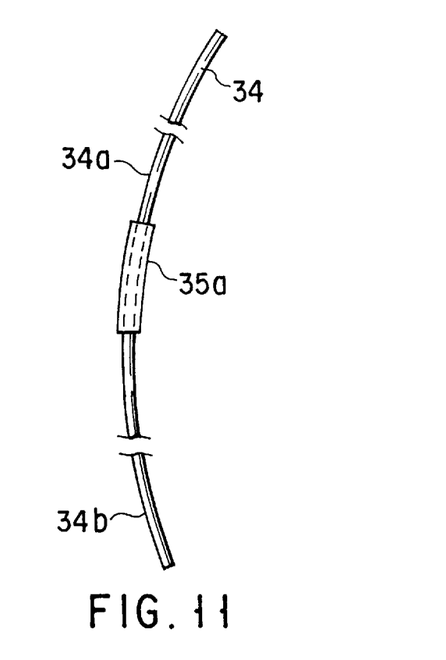
FIG. 11 is a side view showing a state in which one retainer is fixed to a wire rope of a synchronous cable according to a fourth embodiment of the invention.
Figure 12:
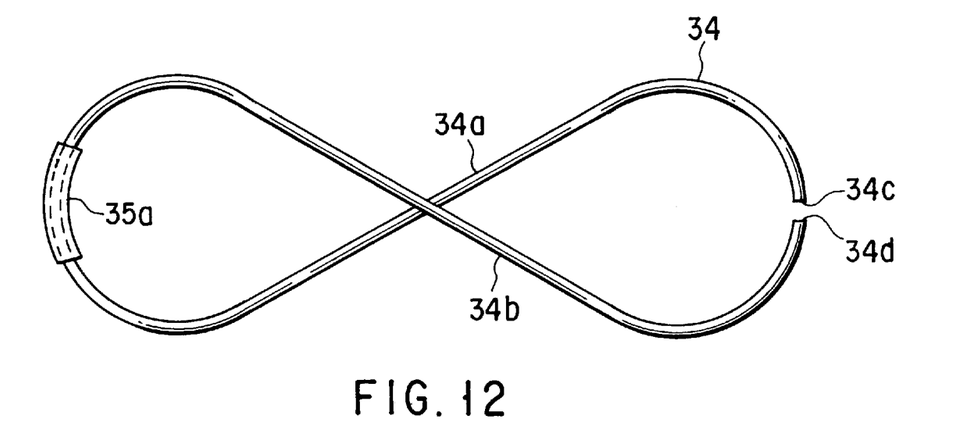
FIG. 12 is a side view showing a state in which the wire rope shown in FIG. 11 is made to cross in the shape of the figure "8"
Figure 13:
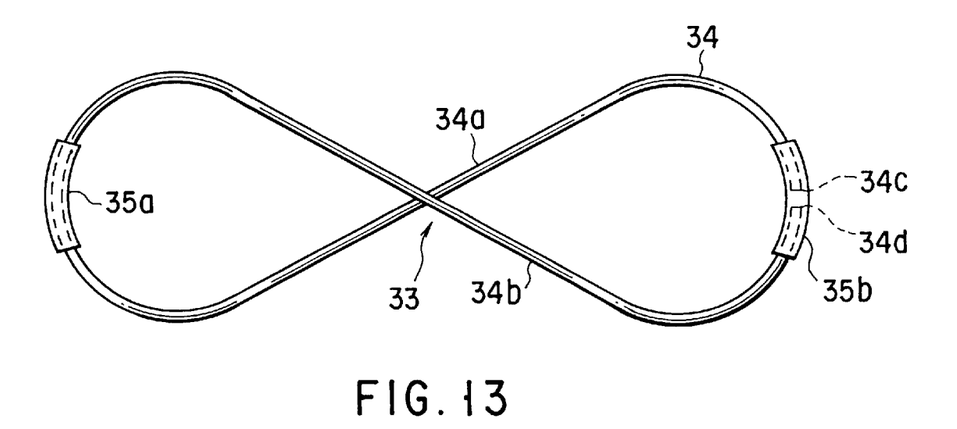
FIG. 13 is a side view showing a state in which the other retainer is fixed to the wire rope shown in FIG. 12.

Referring now to FIGS. 11 to 13, there will be described an example of a manufacturing method for the synchronous cable 33. First, according to this embodiment, the one retainer 35a is fixed to the central portion of the wire rope 34 with a predetermined length with respect to the lengthwise direction, as shown in FIG. 11. This fixing operation is achieved by loosely fitting the retainer 35a on the central portion of the rope 34 and then caulking it.

Subsequently, one half portion 34a and the other half portion 34b of the wire rope 34 are twisted in opposite directions on either side of the retainer 35a, whereby they are formed into substantially oppositely S-shaped structures, individually, as shown in FIG. 12. Thereafter, opposite ends 34c and 34d of the rope 34 are inserted into the other retainer 35b, and the retainer 35b is caulked, as shown in FIG. 13. In this process, the opposite ends 34c and 34d are coupled to each other. In the synchronous cable 33 completed in this manner, the wire rope 34 is subjected to a torsional stress, so that its 8-shaped form can be maintained in a free state without the influence of any external force.

In this embodiment, the synchronous cable 33 is previously formed crossing in the shape of the figure "8". In incorporating the cable 33 into the continuously variable transmission of the toroidal type, therefore, the shape of the cable 33 need not be changed into the shape of the figure "8" by means of external force. In consequence, the retainers 35a and 35b can be easily fitted into the retainer mounting portions 40 of the trunnions 6a and 6b. Thus, the cable 33 can be incorporated into the transmission with higher efficiency.

Figure 14:
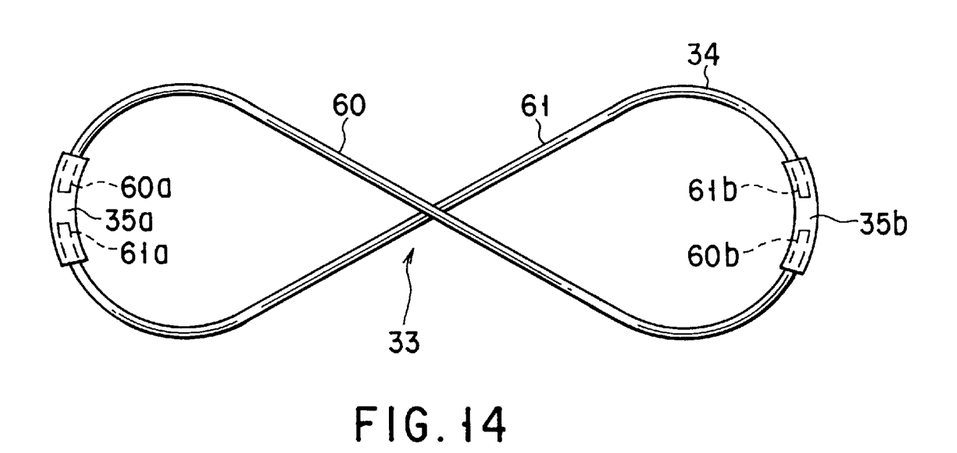
FIG. 14 is a side view of a synchronous cable according to a fifth embodiment of the invention.

FIG. 14 shows another example of the manufacturing method for the synchronous cable 33. A wire rope 34 of this cable 33 is composed of a pair of rope elements 60 and 61 that are connected in series with each other. The length of each rope element is a little shorter than half that of the wire rope 34. First ends 60a and 61a of the rope elements 60 and 61 are connected in series with each other by means of one retainer 35a. The other ends 60b and 61b of the elements 60 and 61 are connected to each other by means of the other retainer 35b. In this embodiment, the synchronous cable 33 is given the shape of the figure "8" in the following manner. After the rope elements 60 and 61 are coupled to the one retainer 35a, they are twisted into the shape of an "S" each. Then, the respective other ends 60b and 61b of the rope elements 60 and 61 are connected to each other by means of the other retainer 35b. For other arrangements and functions, this embodiment resembles the foregoing embodiments.

In any of the embodiments described above, the synchronous cable 33 is incorporated in a continuously variable transmission of the single-cavity toroidal type. It is to be understood, however, that the present invention is also applicable to a synchronous cable used in a continuously variable transmission of the double-cavity toroidal type. In this case, the synchronous cable is passed around and between a pair of trunnions that are arranged between two input discs and two output discs.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A synchronous cable used in a continuously variable transmission of the toroidal type, the continuously variable transmission including an input disc rotatably mounted on an input shaft, an output disc coaxially opposed to the input disc, a pair of trunnions rockable around pivots situated beside the input shaft and between the input and output disc, and power rollers mounted individually on the trunnions for rotation and in contact with the input and output discs, the synchronous cable comprising:

a wire rope passed around and between the trunnions, crossing in the shape of the figure "8"; and one retainer connecting the opposite ends of the wire rope to make the rope an endless loop and the other retainer situated opposite to the one retainer, the retainers being attached individually to the trunnions, each said retainer being formed of an arcuate metallic tube extending along the circumference of each corresponding trunnion, the intermediate portion of the tube other than the longitudinally opposite end portions thereof being fixed to the wire rope by caulking.

2. A synchronous cable according to claim 1, wherein the opposite ends of said wire rope are connected by means of the one retainer under a torsional stress such that the synchronous cable can maintain an 8-shaped form in a free state without the influence of any external force.

3. A synchronous cable used in a continuously variable transmission of the toroidal type, the continuously variable transmission including an input disc rotatably mounted on an input shaft, an output disc coaxially opposed to the input disc, a pair of trunnions rockable around pivots situated beside the input shaft and between the input and output disc, and power rollers mounted individually on the trunnions for rotation and in contact with the input and output discs, the synchronous cable comprising:

a wire rope passed around and between the trunnions, crossing in the shape of the figure "8"; and one retainer connecting the opposite ends of the wire rope to make the rope an endless loop and the other retainer situated opposite to the one retainer, the retainers being attached individually to the trunnions, each said retainer having the shape of a circular arc extending along the circumference of each corresponding trunnion and being formed into a tube shape by casting and bonded to the wire rope, the tube-like retainer surrounding a portion of the wire rope to be fitted with the retainer.

4. A synchronous cable according to claim 3, wherein the opposite ends of said wire rope are connected by means of the one retainer under a torsional stress such that the synchronous cable can maintain an 8-shaped form in a free state without the influence of any external force.

5. A synchronous cable used in a continuously variable transmission of the toroidal type, the continuously variable transmission including an input disc rotatably mounted on an input shaft, an output disc coaxially opposed to the input disc, a pair of trunnions rockable around pivots situated beside the input shaft and between the input and output disc, and power rollers mounted individually on the trunnions for rotation and in contact with the input and output discs, the synchronous cable comprising:

a wire rope passed around and between the trunnions, crossing in the shape of the figure "8"; and one retainer connecting the opposite ends of the wire rope to make the rope an endless loop and the other retainer situated opposite to the one retainer, the retainers being attached individually to the trunnions, each said retainer including an arcuate first retainer element fixed to the wire rope and second retainer elements arranged individually near the opposite ends of the first retainer element so as to be rotatable relatively thereto.

6. A synchronous cable according to claim 5, wherein the opposite ends of said wire rope are connected by means of the one retainer under a torsional stress such that the synchronous cable can maintain an 8-shaped form in a free state without the influence of any external force.

7. A synchronous cable used in a continuously variable transmission of the toroidal type, the continuously variable transmission including an input disc rotatably mounted on an input shaft, an output disc coaxially opposed to the input disc, a pair of trunnions rockable around pivots situated beside the input shaft and between the input and output disc, and power rollers mounted individually on the trunnions for rotation and in contact with the input and output discs, the synchronous cable comprising:
a wire rope passed around and between the trunnions, crossing in the shape of the figure "8"; and
one retainer connecting the opposite ends of the wire rope to make the rope an endless loop and the other retainer situated opposite to the one retainer, the retainers being attached individually to the trunnions,
the opposite ends of the wire rope being connected by means of the one retainer under a torsional stress such that the synchronous cable can maintain an 8-shaped form in a free state without the influence of any external force.

8. A manufacturing method for a synchronous cable used in a continuously variable transmission of the toroidal type, the continuously variable transmission including an input disc rotatably mounted on an input shaft, an output disc coaxially opposed to the input disc, a pair of trunnions rockable around pivots situated beside the input shaft and between the input and output disc, and power rollers mounted individually on the trunnions for rotation and in contact with the input and output discs, the synchronous cable comprising a wire rope passed around and between the trunnions, crossing in the shape of the figure "8", and a first retainer connecting the opposite ends of the wire rope to make the rope an endless loop and a second retainer situated opposite to the one retainer, the retainers being attached individually to the trunnions, the manufacturing method comprising:

a process for fixing the second retainer to the central portion of the wire rope with respect to the lengthwise direction thereof;
a process for twisting the wire rope to make the rope cross in the shape of the figure "8"; and
a process for connecting the opposite ends of the wire rope by means of the first retainer while keeping the rope twisted so that the synchronous cable can maintain the 8-shaped form in a free state without the influence of any external force.

* * * * *